UNITED STATES PATENT OFFICE.

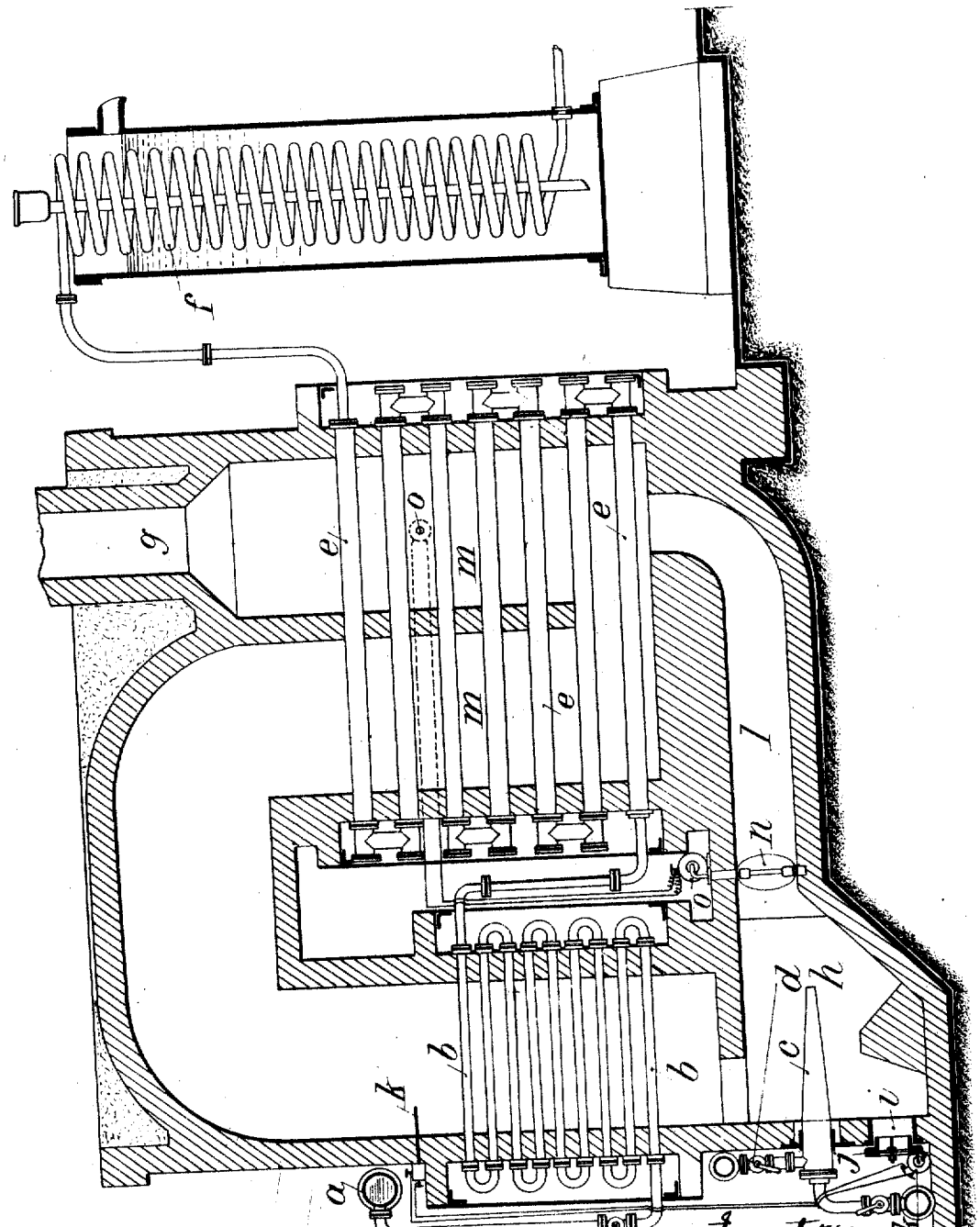

ALBERT LOUIS ANTOINE PAGÈS AND RENÉ PAUL THOMAS DUCHEMIN, OF PARIS, FRANCE.

MANUFACTURE OF ACETONE.

933,107.  Specification of Letters Patent.  Patented Sept. 7, 1909.

Application filed April 5, 1906. Serial No. 310,022.

*To all whom it may concern:*

Be it known that we, ALBERT LOUIS ANTOINE PAGÈS and RENÉ PAUL THOMAS DUCHEMIN, both citizens of the Republic of France, residing at Paris, France, have invented a new and useful Improvement in the Manufacture of Acetone, which improvement is fully set forth in the following specification.

This invention has for its object the manufacture of acetone by the action, under the influence of heat, of a current of vapor of distilled pyroligneous acid upon an acetate. The acetate decomposed by the heat into acetone and a carbonate is regenerated by the action of the vapors of acetic acid in such a manner that the same weight of acetate, without renewal, can serve for the almost unlimited production of acetone.

The process usually employed for the manufacture of acetone consists in decomposing calcium acetate in iron vessels by heat. It therefore necessitates the previous preparation of calcium acetate, which is obtained by saturating distilled pyroligneous acid with lime. This operation is difficult, and moreover the acetone prepared by this process is impure. It has been proposed also for that purpose to pass the raw products of distillation of wood and the like through or over oxids, carbonates or acetates of heavy metals; but in this case it is altogether impossible to obtain pure acetone, even after long and costly processes of rectification and, besides, the operation cannot be continuous, being limited, as it were, to the successive periods of distillation of successive charges of organic matter. It has been proposed finally, in order to obtain pure acetone, to pass vapors of acetic acid over carbonates of alkaline earths at a relatively high temperature (about 500° C.) but this has proved unsatisfactory.

This invention allows acetone in a practically pure condition to be obtained in a continuous manner by starting directly from distilled pyroligneous acid and consequently avoiding the previous preparation of calcium acetate or acetic acid. For this purpose, we heat as regularly as possible, either in metal or other tubes, or any other apparatus allowing an intimate contact between the substances taking part in the reaction, an acetate, and we pass over this body thus heated a continuous current of distilled pyroligneous acid. The temperature to which the acetate is heated is preferably about 575° centigrade. The acetate decomposes, under the influence of heat into acetone which is condensed, and into carbonate upon which the vapors of acetic acid contained in the pyroligneous acid act to regenerate the acetate. The regenerated acetate is again decomposed under the influence of heat into acetone and carbonate, and the reaction proceeds indefinitely in such a manner that the same quantity of acetate serves in a continuous manner for the manufacture of acetone. In order to increase the surface of contact between the acid vapors and the acetate, we employ, as a carrier for the acetate, inert porous bodies, such as fragments of coke or refractory bricks, which it is sufficient to impregnate with a solution of the body to be treated. The state of dilution of the acid is not very important, the action taking place whatever may be the strength of the acid liquid. As regards the temperature of decomposition, it varies according to the base or acetate employed, but always remains within a limit much lower than has hitherto been considered necessary for the decomposition of the acetates. With certain acetates it is considerably lower than the temperature of incipient red. As to the nature of the acetate employed, any acetate may be used which fulfils the following conditions: 1. Being capable of being transformed into an acetate by the action of a gaseous current containing acetic vapors and at a temperature lower than that at which acetone is destroyed. 2. The acetate produced being capable, at a temperature lower than that at which acetone is destroyed, of being disassociated by water, carbonic acid, acetone and a free base ready to be acted upon by the acetic vapors. 3. Being capable of being deposited by any means, in the shape of a thin coating on the surfaces of porous or spongy bodies, or such as present a very extended surface (pumice stone, coke, metal gauze or other woven fabrics, asbestos, etc). A great many substances fulfil said conditions, such for example, as zinc or analogous metal acetates or the acetates of the alkali metals, the alkaline earth metals (acetate of barium or magnesium). We have found in fact that we may use the acetates of all the alkali metals, alkaline earth metals, earth metals and of metals generally, with the exception of the acetates of copper and precious metals. The possibility of keeping the temperature within such narrow limits is obtained especially by the use of distilled pyroligneous acid on account of the regulating action of the superheated steam which accompanies the acetic vapors and by the use of narrow tubes having a diameter of about 100 millimeters, for the reaction.

In the accompanying drawing we have shown in diagrammatic section the preferred form of apparatus to be employed in carrying out this invention.

In this drawing, $a$ is a main, fed with pyroligneous acid from a receptacle (not shown) and from which the acid flows to a vaporizing tube or coil $b$ heated by any suitable furnace such as an oil burner $c$ to which the liquid fuel is fed from the tubes $d$. From the vaporizer $b$, the acid vapors are passed successively through a series of tubes $e$ of relatively small diameter (about 100 mm.) charged with the acetate, and the vapors of acetone formed are led into a condensing coil $f$ cooled by water. The tubes $e$ are heated by the hot gases passing from the burner $c$ to the chimney $g$ after their passage around the vaporizer $b$.

In order to maintain the temperature in the tubes $b$ and $e$ practically constant, which is an essential feature of applicants' process, the combustion chamber $h$ is provided with an air inlet $i$ the regulating valve $j$ of which may advantageously be controlled by an electrical thermostat $k$ of any well known type the heat responsive part of which is placed at the top of the vaporizer $b$; moreover, in order to regulate the heat of the gases circulating around the tubes $e$, one or more direct connections $l$ for the gases may be established between the combustion chamber $h$ and the flues $m$ $m$ and provided with regulating valves $n$ preferably actuated by electrical thermostats $o$ of any suitable type arranged at appropriate places between the tubes $c$. This arrangement for regulating the temperature in the tubes $b$ $e$ might however be replaced by any other well known arrangement such as steam jackets, liquid baths or sand baths.

Having thus fully described our invention, what we claim is:—

1. The process of making acetone, which consists in passing continuously vapors of diluted pyroligneous acid over an acetate which may be formed by the initial action of the distilled vapors upon a base, heated to about 575° C., and leading off the acetone thus formed.

2. The process of making acetone, which consists in passing continuously over an acetate which may be formed by the initial action of the distilled vapors upon a base, heated to about 575° C., and leading off the acetone thus formed.

3. The process of making acetone, which consists in passing continuously vapors of distilled pyroligneous acid over a heated acetate capable of forming acetone on heating, and leading off the acetone thus formed.

4. The process of making acetone which consists in passing vapors of distilled pyroligneous acid over an acetate capable of forming acetone on heating, said acetate being maintained at a temperature lower than that of incipient red, leading off the acetone thus formed and condensing the same.

In testimony whereof we have signed this specification in the presence of two subscribing witnesses.

ALBERT LOUIS ANTOINE PAGÈS.
RENÉ PAUL THOMAS DUCHEMIN.

Witnesses:
JEAN VAUCHER,
HANSON C. COXE.